Dec. 30, 1930. J. L. BROWNELL 1,786,515
FLOODLIGHT
Filed Dec. 18, 1928

Patented Dec. 30, 1930

1,786,515

UNITED STATES PATENT OFFICE

JAMES L. BROWNELL, OF KALAMAZOO, MICHIGAN

FLOOD LIGHT

Application filed December 18, 1928. Serial No. 326,729.

This invention relates to floodlights and more especially involves a floodlight belonging to the stationary type which is fully adjustable yet which is compact, efficient, inexpensive, and admirably suited to fulfill the functions and purposes for which it was designed.

Among the objects and advantages of my invention, therefore, are the following: the provision of a stationary floodlight of the delicate filament type; the provision of such a floodlight which is adjustable and long-wearing; the provision of a floodlight having an adjustable bulb so positioned and arranged as to avoid the so-called critical angle; the provision of a novel reflector therefor providing efficient ventilation; and a generally simple, inexpensive, and practical device.

Other objects and advantages will be apparent or pointed out hereinafter in the specification or in the drawing wherein:

Figure 1 is a vertical section of a floodlight embodying my invention;

Figure 2 is a front elevational view thereof with parts broken away; and

Figure 3 is a fragmentary rear view of the supporting bracket and hinge.

Similar numerals refer to similar parts throughout the several views.

Referring to the drawing in detail 10 is a semi-circular shell or casing having a central aperture 11 and an annular concave flange 12. Within the shell and spaced appreciably therefrom, as shown, is a substantially parabolic reflector 13 having four lips 14 at equally spaced points therearound at which it is secured by nut and bolt fastenings 15 to the shell or casing 10. The shape of the reflector and the manner in which it is cut away will provide excellent ventilation as is apparent.

The reflector 13 has an aperture 16 below its center for the reception of the source of light 17 and this aperture acts also to aid ventilation. Its main function will, however, be more clearly explained hereinafter.

Secured to shell 10, as by rivets 18, is an angle bracket 19. This bracket proceeds vertically downwardly along the inside of the shell and then bends substantially at right angles and extends horizontally almost to the reflector 13 whereat it again bends at right angles and extends vertically downwardly.

A bushing 20 partially externally threaded closes aperture 11 as shown. The head of the bushing is larger than the aperture thus making it waterproof. The bushing has a central hole for a purpose to be explained. A nut 21 holds the bushing firmly yet removably in place. A knurled hand nut 22 with a central hole is on the externally projecting portion of shaft 23, whose other end is supported in a hole in the vertically downwardly extending end of bracket 19. A pin 24 may secure nut 22 to shaft 23. As shown, shaft 23 is smooth for a distance where it passes through nut 22 and bushing 20, then is threaded the rest of its length, except at the end resting in bracket 19. On this threaded portion is the internally threaded adjusting nut 25 adapted to travel the length of the threaded portion of shaft 23.

The exterior of said nut 25 is stepped and on the intermediate step is tightly fitted a socket holding bracket 26. The top portion of this bracket has a U-shaped slot so that brackets 19 and 26 serve as cooperating guides in slidable relation. The lower end of bracket 26 carries a socket 27, which may be of porcelain, for the bulb or source of light 17. This socket is arranged at exactly a 45 degree angle and extends partly through aperture 16 in reflector 13. The lead wires 30ª of the source of light extend from a source of current through a weatherproof connection consisting of cooperating bushing and disk members 28 and 29 as clearly seen in the drawing.

The open end of the shell 10 is closed by the lens 30. To prevent cracking or breaking the lens, packing 31 is provided in the usual manner. The rim 32 fits over the edge of the lens in the usual manner and is detachably fastened by tightening elements 33 in the known manner, of which there are preferably three equilaterally spaced.

Supporting bracket 34 is secured to the bottom of the shell 10 and has a depending interiorly threaded portion 35 pivotally secured thereto at 36. The portion 35 is split and provided with contracting screw arrangement 37 whereby it can be tightened about the end of a supporting stand (not shown) adapted to fit thereinto. Wing nut 38 permits holding the parts in adjusted position.

The forward portion of bracket 34 has a square-shaped tongue portion 39. Secured to the bottom of rim 32 is a smaller bracket 40 the other end of which is pivoted to the upper part of portion 39 of bracket 34. Shaft 41 forms the pivot and may be fastened by pins as shown.

To open the floodlight, fastening elements 33 are loosened whereupon the lens may be swung down about pivot 41. The lower portion of tongue 39 forms a stop to prevent excessive movement and as shown allows about a 90 degree hinging action.

The bulb 17 may be moved from full line position up to and including the dotted line position. Turning nut 22 turns shaft 23 which causes nut 25 and bracket 26 to move outwardly towards dotted line position of these parts. Socket 27 moves further through aperture 16 in reflector 13 until abutting position is reached as a limit. The bulb is always at the same angle as shown and moves without raising or lowering the line of center. Shaft 23 is on the same center line for this purpose.

The bulb is provided with a very delicate filament (not shown) as no vibration or shock is experienced in this type of light. In view of this, it is important to keep the bulb at the angle shown because delicate filaments cannot be safely burned at all angles especially within the critical angle. As in practice the light is tilted either up or down 45 degrees, this brings the bulb in a horizontal or vertical position, thus avoiding the critical angle and giving the light long life.

Such lights may be used in outdoor floodlighting of many sorts.

All the above is intended to be more illustrative than limitative so that I do not limit myself thereto except as contained in the subjoined claims.

Having thus described my invention and illustrated its use, what I claim as new and desire to secure by Letters Patent of the United States is:

1. In a floodlight, a semi-circular shell having a central aperture, a bracket secured to said shell and having a horizontal portion, a lateral bearing portion at the outer end of said bracket, a socket supporting bracket guided by said horizontal portion, a spaced reflector having an aperture below its center, a socket on said socket supporting bracket projecting through the aperture in said reflector, a source of light in said socket having its center line coincident with the center line of the shell and reflector, and means in part supported by said shell and in part by said bracket bearing portion for moving said socket supporting bracket, socket, and source of light along said line of centers.

2. In a floodlight, a shell having a central aperture, a bracket secured to said shell, said bracket extending vertically downwardly, horizontally forwardly, and then vertically downwardly, the last named portion having an aperture, a bushing in the aperture of the shell, a shaft supported in said bushing and last named bracket portion, a nut on said shaft, a socket supporting bracket about said nut and slidably engageable with the horizontal portion of said first named bracket, and means for advancing said nut and socket supporting bracket on said shaft.

3. In a floodlight, a shell having a central aperture, a bracket secured to said shell, said bracket extending vertically downwardly, horizontally forwardly, and then vertically downwardly, the last named portion having an aperture, a bushing in the aperture of the shell, a shaft supported in said bushing and last named bracket portion, a nut on said shaft, a socket supporting bracket about said nut and slidably engageable with the horizontal portion of said first named bracket, and means for advancing said nut and socket supporting bracket on said shaft, said means including a knurled head secured to the projecting end of said shaft for turning it and cooperating exteriorly and interiorly threaded portions on said shaft and nut respectively.

4. In a stationary type floodlight including a shell, a reflector in the shell and having an elongated socket receiving opening at one side of its axis, a lamp socket, a socket carrier having an angular socket carrying portion adapted to dispose a socketed lamp in alinement with the reflector axis and at an angle thereto, fixedly journalled rotatable means having an actuating portion and supporting said carrier for movement parallel to said reflector axis, an actuating connection between said rotatable means and carrier, a supporting bracket for said rotatable means and having a guide portion parallel with said reflector axis, and said carrier having a seat engaging said bracket guide portion.

5. In a floodlight including a shell, a reflector in the shell and having an elongated socket receiving opening at one side of its axis, a lamp socket adapted to project through said opening, a lamp in said socket, a socket carrier, a worm shaft parallel with said reflector axis, a traveller supported on said worm shaft and rigidly supporting said carrier, a bracket providing a bearing for one end of said worm shaft and having a portion parallel with said worm shaft, a guide portion associated with said carrier and engaging said horizontal bracket portion, said carrier rigidly supporting said lamp coincident with the axis of said reflector and at a predetermined angle with respect thereto, and actuating means for said worm shaft at one side of said bearing.

In testimony whereof I hereunto set my hand this eleventh day of December, 1928.

JAMES L. BROWNELL.